United States Patent Office 3,313,591
Patented Apr. 11, 1967

3,313,591
PROCESS OF GRAFT POLYMERIZING ETHYLENICALLY UNSATURATED MONOMERS TO SOLID, SHAPED POLYCARBONAMIDES EMPLOYING HEAT AS THE SOLE GRAFT INITIATOR
David Tanner, McDaniel Crest, Del., assignor to E. I. du Pont de Nemours and Company, Wilmington, Del., a corporation of Delaware
No Drawing. Filed Nov. 29, 1963, Ser. No. 327,107
5 Claims. (Cl. 8—115.5)

This application is a continuation-in-part of my application Ser. No. 783,682, filed Dec. 30, 1958, now abandoned, which in turn was a continuation-in-part of my application Ser. No. 719,659, filed Mar. 6, 1958, and now U.S. Patent No. 3,099,631.

The present invention relates to a novel and useful process for preparing a shaped structure of a polyamide polymer. More particularly, it relates to a process for grafting an organic vinyl compound to a shaped structure produced from a solid synthetic linear polyamide, without destroying the structural shape.

The physical properties of a structure formed from a synthetic condensation polyamide such as the dyeability, moisture regain, light durability, heat resistance, density and the like of a synthetic textile (i.e., a filament, fiber, staple, floc, yarn, tow, cord, fabric, or the like) are largely determined by the nature of the polymer from which the structure is prepared. Because of this identity of physical properties and chemical natures the choice of a particular polymer for a particular end use has in the past been a matter of balancing desirable versus non-desirable properties in any particular polymer. The process of the present invention is directed to the modification of the chemical nature of any particular condensation polyamide only to the extent necessary to impart a physical or chemical property previously lacking without substantially affecting the gross properties of the original condensation polymer, and without destroying its structural shape.

It is an object of this invention to provide a process for grafting a vinyl-type modifier to a shaped structure formed from a synthetic polyamide. Other objects and achievements of this invention will become apparent as the description of the invention proceeds.

These objects are accomplished by the present invention by a process which consists of heating the selected polycarbonamide structure, at a temperature which will not destroy the shaped structure, with a polymerizable, monoethylenically unsaturated monomer of molecular weight greater than 28 until graft-copolymerization has been achieved, said heating together constituting the sole means for producing free radicals applied to said structure, either before or during the process.

Restated in different words, the present invention provides a process for preparing a grafted copolymer by contacting a solid synthetic linear condensation polyamide with a liquid containing a vinyl monomer of the formula $$CX_2=CX_2$$

wherein X is selected from the group consisting of hydrogen, an organic radical and an inorganic radical with the proviso that at least one X is other than hydrogen, said contacting being done at a temperature sufficient to effect graft-copolymerization between the particular vinyl monomer and polyamide being treated, but in no event lower than 25° C. and in no event so high as to melt said polyamide. When grafting takes place, the double bond of the vinyl monomer breaks and the vinyl monomer adds to the polyamide chain as a side group. Also, the vinyl monomer polymerizes so that larger side chains are built up on the polyamide.

By the term "solid synthetic linear condensation polyamide" is meant a polyamide in solid form (unmelted) containing a carbonamide unit as a linking unit in the main polymer chain. Such polyamides are conveniently prepared by the reaction of a polycarboxylic acid such as adipic acid (or an amide-forming derivative thereof) with a polyamine such as hexamethylene diamine. The term "liquid containing a vinyl monomer" is used to signify any liquid which contains, at least in part, the monomer. Thus, a solution of a liquid or gaseous vinyl monomer in a convenient volatile solvent, such as water, methanol or xylene, may be employed. Also, when the monomer itself is liquid at the contacting temperature, the liquid monomer without solvents may be used.

To assure deep penetration of the vinyl monomer into the shaped structure, a pre-soaking treatment may be used, which consists of soaking the polymer in a liquid containing the monomer, said liquid being a swelling agent for the polyamide. In such a treatment, the vinyl monomer soaks into the polyamide and gives better penetration for the subsequent grafting procedure. In such a treatment, the temperature, of course, should be below that which induces the monomer to homopolymerize. Such temperature will depend on the particular monomer being used, and may be, with some vinyl compounds as high as 200° C., and with others as low as 0° C. But often such a pre-soaking treatment will not be required, inasmuch as the time required for the principal treatment, i.e. the graft-copolymerization, is often considerable and therefore automatically allows time for the vinyl compound to penetrate into the shaped structure.

The grafting temperature is, of course, to be high enough to initiate and continue graft-copolymerization. This automatically raises its value above that employed in the soaking treatment, if any was employed. In some cases it may be as low as 25° C.; in the more common case, 50° C. and up is preferred, but in no event should the temperature selected be so high as to melt the polycarbonamide being treated. When a highly modified polyamide (i.e., one containing a high percentage of the vinyl monomer) is desired, the temperature should be at least that required to homopolymerize the vinyl monomer, to reduce the time required. The pressure employed may vary widely but using at least autogenous pressure reduces the solvent and monomer losses in the system.

Where a pre-soaking treatment has been employed, it may be desirable to eliminate solvent and excess vinyl monomer, as by decanting, or by squeezing in the case of a yarn or fabric, prior to applying the heating for the graft-polymerization step.

The following examples are cited to illustrate the invention. They are not intended to limit it in any manner.

In the examples, the conversion of modifier to unextractable graft copolymer and the content of unextractable modifier in the graft copolymer are measured as follows: A weighed sample of copolymer is extracted in a Soxhlet extractor for 24 hours with a suitable extractant for the modifier. The extract is discarded. The residue is dried in a nitrogen atmosphere of reduced pressure at 120° C. and weighed. The sample is then dissolved in a suitable solvent. A precipitant for the polyamide polymer which is a solvent for the ungrafted modifier is added dropwise to the filtrate under vigorous stirring until no more precipitate is formed. The precipitate is filtered off, rinsed with precipitant, and dried to constant weight at 120° C. in a nitrogen atmosphere of reduced pressure. The content of grafted modifier in the so-prepared sample is analyzed by proper analysis.

*Example I*

A 4″ x 4″ piece of fabric (warp 105, filling 98) made of 70 total denier, 34 filament poly(hexamethylene adipamide) yarn was soaked for 24 hours, at 30° C. and under a moderate vacuum, in a deaerated, 25% aqueous acrylic acid solution. The fabric was then thoroughly rinsed with water (which is an extractant for the modifier) at 60 to 80° C. The fabric was found to have gained 18% in dry weight. When the sodium salt of the grafted acrylic acid was formed by boiling in dilute sodium hydroxide solution, improved antistatic effect, improved resistance to hole melting, wet crease recovery and improved wickability were noted.

To establish that the acrylic acid has been grafted to the nylon, a portion of the treated fabric was dissolved in 90% formic acid, followed by recovering of the dissolved polymer by pouring the solution into water contained in a Waring Blendor, filtering, and washing the precipitate thoroughly with water. Titration of the precipitated polymer shows 1626 equivalents of carboxyl per $10^6$ grams of polymer as compared to 1656 ends before precipitation and washing.

*Example II*

Poly(hexamethylene adipamide) flake is boiled in an excess of a 50% solution of styrene in methanol (boiling temperature approximately 60° C.), in a vessel vented to the atmosphere for 20 hours. "Excess" solution means about 30 times the amount of styrene which is intended to be grafted. The flake is then removed from the solution and treated with extractant, dissolved and reprecipitated, following the technique described in Example I (extractant: xylene; solvent: benzyl alcohol; precipitant: xylene). The product contains more than 39% (based on weight of product) of styrene grafted onto the poly(hexamethylene adipamide), and has a low temperature coefficient of viscosity. Accordingly, the grafted polyamide when in a molten form, shows substantially no viscosity change with a change in temperature, and spinning of the polyamide into fibers can take place over a large temperature range.

*Example III*

A piece of fabric (warp 105, filling 98) made of 70 total denier, 34 filament poly(hexamethylene adipamide) yarn was soaked for 15 hours at 25° C., in a tube sealed under vacuum, in an excess of 50% solution of vinylidene chloride in methanol, and then heated at 95° C. for 32 hours. "Excess" means about 20 times the amount of modifier that was to be grafted. The product was then treated with extractant (dioxane) and showed a weight gain of 6.2%. It was then dissolved in benzyl alcohol and reprecipitated with dioxane as described above. From chlorine analysis of the reprecipitated product, it was calculated that this product contained 2.1% of grafted vinylidene chloride. The difference between the 6.2% and 2.1% represents unextracted ungrafted homopolymer. The resulting grafted polyamide was more flameproof than the ungrafted polyamide.

*Example IV*

A piece of fabric (warp 105, filling 98) made of 70 total denier, 34 filament poly-ε-aminocaproic acid was treated following the technique of Example III. The weight gain after the extraction was 7.6%. From the chlorine analysis, it was calculated that the product contained 5.0% grafted vinylidene chloride. The resulting grafted polyamide was more flameproof than the ungrafted polyamide.

*Example V*

Poly(hexamethylene adipamide) taffeta fabric is padded with methoxy-dodecaethyleneoxy-methacrylate:

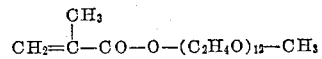

and heated at 90° C. for 24 hours. The fabric is then subjected to seven washings at 60° to 70° C. in a 20 liter agitaiton-type washing machine containing 20 grams of detergent ("Tide"). The fabric is then rinsed and dried and tested for static propensity. Its Log Resistivity, measured at 50% rel. hum. and 78° F. by AATCC method C-76-59, is 10.6, compared to 13.3 for unmodified poly(hexamethylene adipamide) under the same conditions; this test indicates that the nylon has been rendered antistatic.

The polyamides to which this invention is applicable are high molecular weight polyamides which are solid at temperature between about 15° C. and about 100° C. Preferably they are finely divided to facilitate the penetration. Flakes, fibers, fabrics and the like are particularly suitable.

Modifiers which may be used in the process of this invention include styrene, α-methyl styrene, 1,1-diphenyl ethylene, α-vinyl naphthalene, vinylpyridine, 2-chloro-2,3-butadiene, acrylic acid, methacrylic acid, acrylamide, methacrylamide, N - methylolacrylamide, N-methyl-N-vinyl formamide, N-vinyl pyrrolidone, 3-, 4- or 5-methyl-N-vinyl pyrrolidone, vinyl oxyethylformamide, methylene-bis-acrylamide, methyl acrylate, ethyl acrylate, octyl methyl methacrylate, vinylacrylate, acrylonitrile, methacrylonitrile, acrylyl chloride, vinyl methyl ketone, methallylalcohol, acrolein, methacrolein, vinyl acetate, p-vinyl phenyl acetate, methylmethacrylate, vinyl chloride, vinylidene chloride, p-chlorostyrene, 2,5-dichlorostyrene, 1,1,7-trihydro-perfluoroheptyl acrylate, methyl α-chloroacrylate, acrylyl cyanide, styrene sulfonic acid, salts and esters of styrene sulfonic acid, glycidyl methacrylate and lower alkyloxy-polyethyleneoxy-methacrylate (of 1 to 4 C-atoms in the alkyloxy radical and 2 to 20 $CH_2CH_2O$ radicals in the polyethyleneoxy chain).

The pressure during grafting should preferably be maintained above the vapor pressure of the liquid or solution of monomer.

The time for the grafting treatment may be varied widely and will usually depend (a) on the particular vinyl monomer selected as modifier, (b) the quantity thereof that is desired to be grafted on and (c) the temperature used. In above examples, grafting times of 20 to 32 hours have been used. But under certain conditions much shorter reaction times give satisfactory results.

The shaped grafted polyamides resulting from this process may be used in the same manner as the original polyamide polymer. Thus, where the product is a yarn or fabric, it is suitable for use in making clothes, such as blouses, dresses, stockings, shirts or raincoats, and in making industrial articles such as fibers, tarpaulins and the like. They may also be used to form such household goods as rugs, draperies, upholstery material and the like.

Furthermore, although grafting without changing the shape of the polymer article is one of the primary objects of this invention, the products nevertheless may, if necessary or desirable, be molten and resubjected to spinning or shaping by other means into any desirable form, which may be the same or different than the one which the product had during and after the graft-polymerization.

Many other equivalent modifications will be apparent to those skilled in the art from a reading of the above without a departure from the inventive concept.

I claim as my invention:

1. A process for modifying a shaped structure of a solid, high molecular weight, synthetic linear condensation polycarbonamide wherein the carbonamide units are linking units in the main polymer chain, while retaining the structural shape, which comprises heating the shaped polycarbonamide while in contact with a liquid containing polymerizable, ethylenically unsaturated monomer of molecular weight greater than 28, at a temperature between about 25° C. and about 100° C. with the proviso that said temperature be sufficient to effect graft-polymerization but below the melting point of said polycarbonamide, said heating constituting the sole means for producing free radicals applied to said shaped mass prior to and during the above specified process of heating, and said heating being continued until a predetermined degree of graft-polymerization between said polycarbonamide and said unsaturated monomer has been achieved while retaining the structural shape of said polycarbonamide.

2. A process as in claim 1, wherein said shaped structure is in the form of a fabric.

3. A process as in claim 1, wherein said synthetic linear condensation product is polycaproamide.

4. A process as in claim 1, wherein said synthetic linear condensation product is poly(hexamethylene adipamide).

5. A process for modifying a shaped structure of a solid, high molecular weight, synthetic linear condensation polycarbonamide wherein the carbonamide units are linking units in the main polymer chain, while retaining the structural shape, which comprises heating the shaped polycarbonamide while in contact with a liquid containing acrylic acid at a temperature sufficient to effect graft-polymerization but below the melting point of said polycarbonamide and not less than 25° C., said heating constituting the sole means for producing free radicals applied to said shaped mass prior to and during the above specified process of heating, and said heating being continued until a predetermined degree of graft-polymerization between said polycarbonamide and said unsaturated monomer has been achieved while retaining the structural shape of said polycarbonamide.

References Cited by the Examiner

UNITED STATES PATENTS

| | | | |
|---|---|---|---|
| 2,550,650 | 6/1951 | Arnold | 260—857 |
| 2,818,362 | 12/1957 | Drechsel. | |
| 2,861,051 | 11/1958 | Caldwell. | |
| 2,883,360 | 4/1959 | Coover et al. | |
| 2,907,675 | 10/1959 | Gaylord. | |
| 2,921,044 | 1/1960 | Coover. | |
| 2,956,899 | 10/1960 | Cline. | |
| 2,959,569 | 11/1960 | Warrick. | |
| 2,999,056 | 9/1961 | Tanner | 8—115.5 X |
| 2,999,772 | 9/1961 | Burk et al. | |
| 3,088,791 | 5/1963 | Cline et al. | |
| 3,092,512 | 6/1963 | Magat et al. | |
| 3,099,631 | 7/1963 | Tanner | 260—2.5 |
| 3,102,323 | 9/1963 | Adams. | |
| 3,115,418 | 12/1963 | Magat et al. | |

OTHER REFERENCES

Hackh's Chemical Dictionary, Julius Grant, 3rd edition, 1944, p. 813 "Styrene," McGraw-Hill Book Co., Inc., New York, N.Y.

Handbook of Textile Fibers, J. Gordon Cook, third edition, November 1954, p. 683, Merrow Pub. Co., Ltd. Watford, Hertford, England.

NORMAN G. TORCHIN, *Primary Examiner.*

H. WOLMAN, *Assistant Examiner.*